April 30, 1929.    J. W. POWELL    1,711,248
LOCK FOR FISHING LINE REELS
Filed June 3, 1927    3 Sheets-Sheet 1
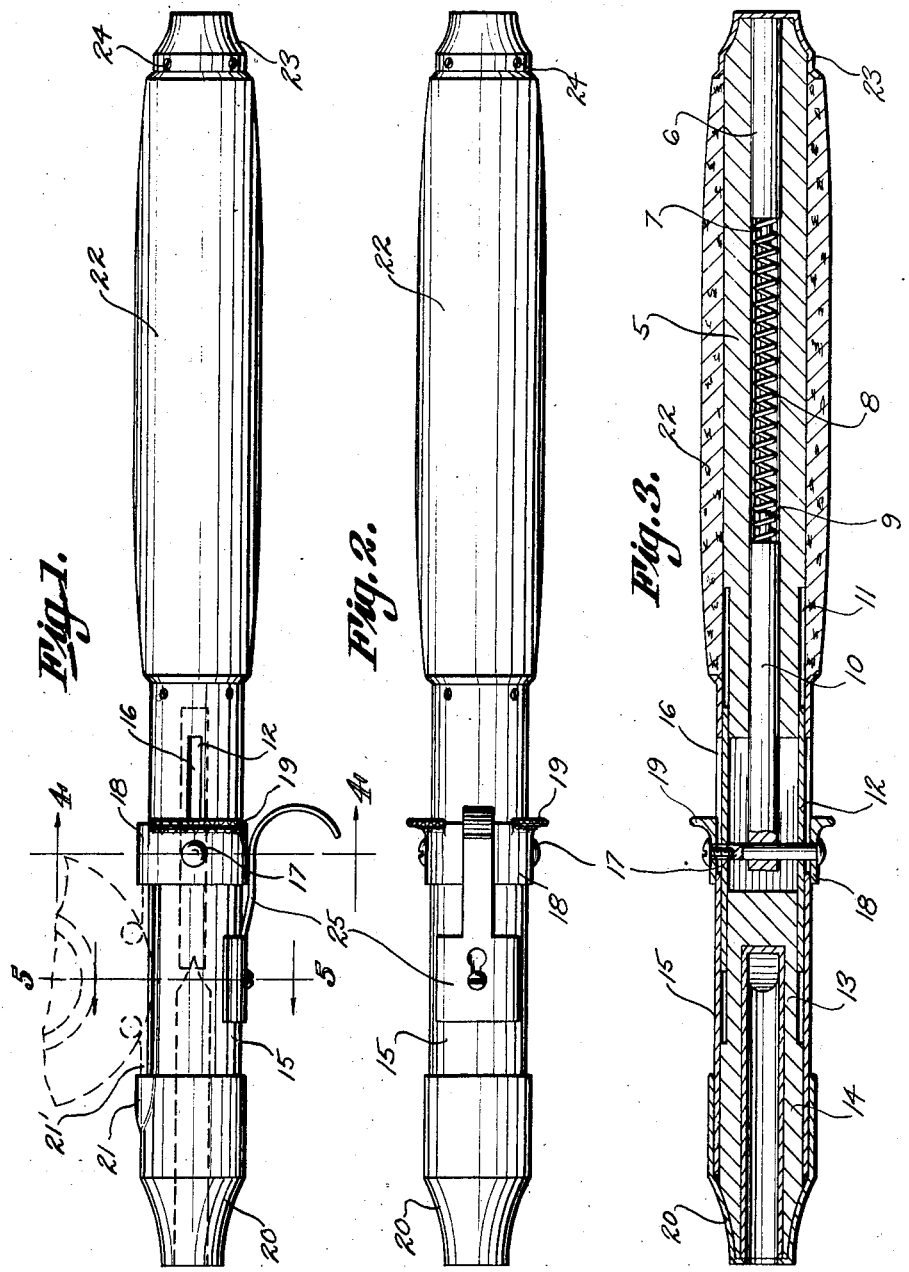
J. W. Powell Inventor April 30, 1929.  J. W. POWELL  1,711,248
LOCK FOR FISHING LINE REELS
Filed June 3, 1927   3 Sheets-Sheet 2
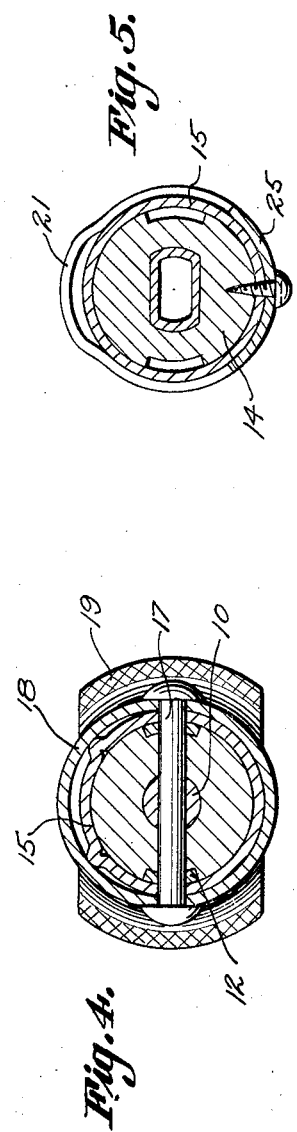
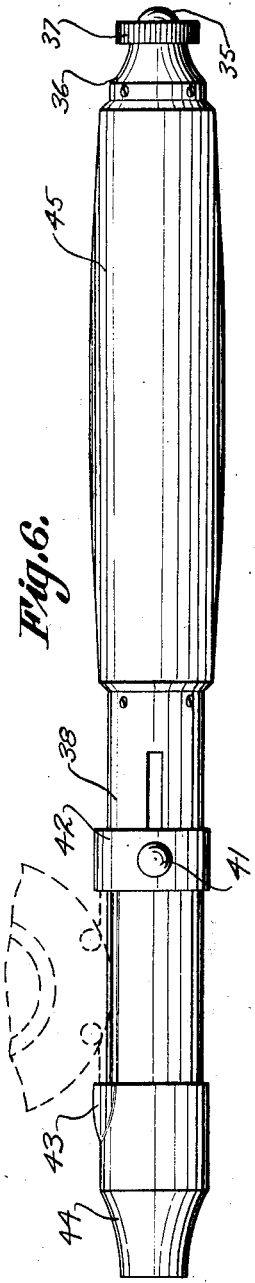
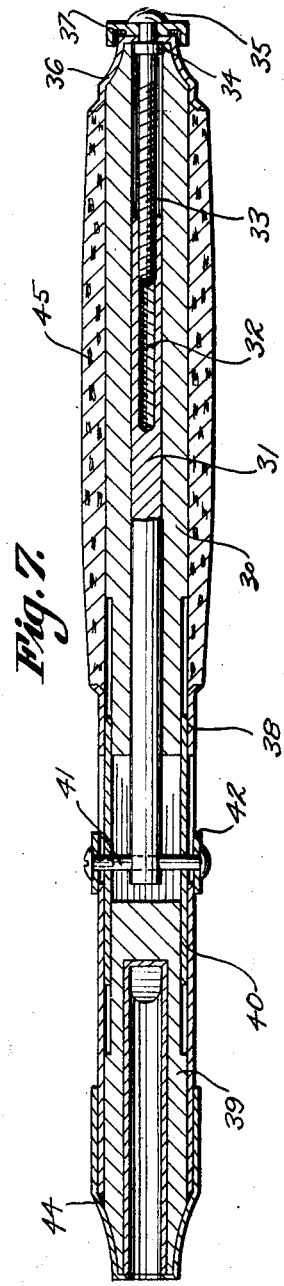
J. W. Powell  Inventor
By C. A. Snow & Co.
Attorneys

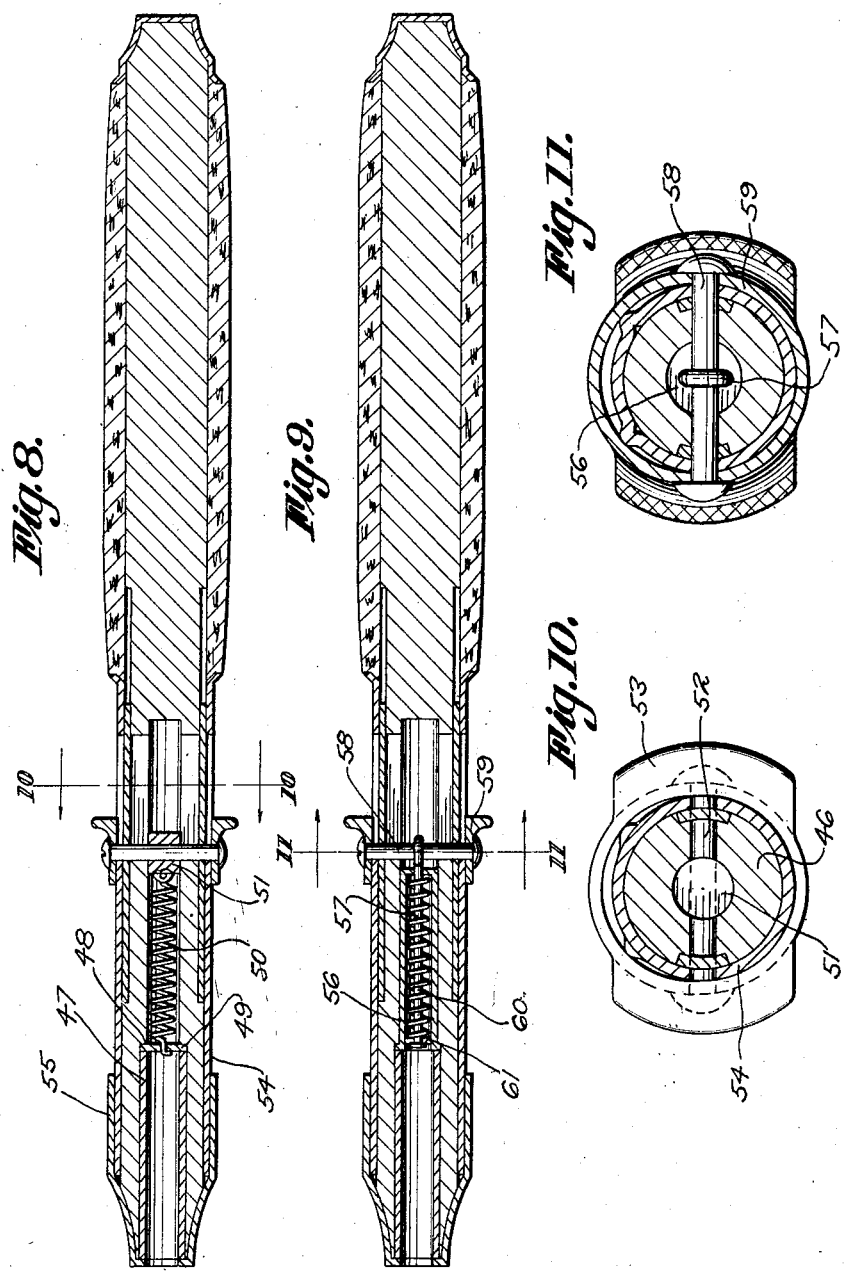

Patented Apr. 30, 1929.

1,711,248

UNITED STATES PATENT OFFICE.

JOSIAH W. POWELL, OF FLORENCE, ALABAMA.

LOCK FOR FISHING-LINE REELS.

Application filed June 3, 1927. Serial No. 196,277.

This invention has reference to fishing rods, and aims to provide novel means whereby a fishing line reel may be secured to a fishing rod in such a way as to insure against the reel becoming loose or displaced during the act of casting.

An important object of the invention is to provide a device of this character which will lock a fishing line reel in position, but will at the same time permit the reel to be readily and easily disconnected from the rod.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a casting rod constructed in accordance with the invention.

Figure 2 is an elevational view taken at right angles to Figure 1.

Figure 3 is a longitudinal sectional view through a handle.

Figure 4 is a sectional view taken on line 4—4 of Figure 1.

Figure 5 is a sectional view taken on line 5—5 of Figure 1.

Figure 6 is an elevational view of a modified form of the invention.

Figure 7 is a longitudinal sectional view through the modified form of handle.

Figure 8 is a sectional view through a further modified form of the invention.

Figure 9 is a sectional view through a still further modified form of the invention.

Figure 10 is a sectional view on line 10—10 of Figure 8.

Figure 11 is a sectional view on line 11—11 of Figure 9.

Referring to the drawings in detail, the reference character 5 designates the handle which is formed with a longitudinal bore in which the pin 6 is mounted, which pin is formed with an extension defining a seat for one end of the coiled spring 8, the opposite end of the coiled spring being fitted over the reduced portion 9 of the rod 10. The handle 5 is provided with an elongated opening extending therethrough, at a point adjacent to the forward end thereof, which opening accommodates the pin 17, to be hereinafter more fully described.

As shown, the handle is formed with a forward reduced portion defining a space 11 for the reception of the plates 12 that move longitudinally of the handle, to close the elongated opening and prevent foreign matter from entering therein.

Mounted on the handle portion directly over the plates 12 is a tubular member 15 in which elongated openings 16 are formed, the openings being disposed directly opposite each other, and designed to accommodate the pin 17 that also extends through openings in the plates 12 connecting the plates 12 to the rod 10 so that movement of the pin will result in a relative movement of the plates and rod.

The pin 17 is also secured to the locking ring 18 by means of the screws 17', the locking ring being formed with enlargements 19, knurled so that the ring may be readily gripped by the fingers of the operator to operate the ring.

At one end of the handle portion 14 is a ferrule 20 that also fits over the tubular member 15, the ferrule being secured in position in any suitable and well known manner.

This ferrule 20 is formed with an offset portion 21 that defines a pocket for the reception of one end of a reel plate 21', the ring 18 being designed to fit over the opposite end of the reel plate to lock the reel plate and reel to the handle.

It will thus be seen that when it is desired to position a reel, the locking ring 18 is moved to compress the spring 8, whereupon the reel is placed on the handle and the locking ring released. It follows that the spring 8 will expand, sliding the locking ring over the reel plate securing the reel in position.

The reference character 22 designates the usual grip of the handle, which may be constructed of cork, rubber or other suitable material. A ferrule indicated at 23 is positioned over one end of the handle and engages one end of the grip 22, the ferrule 23 acting as a stop for the pin 6, the same being secured to the handle by means of the screws 24.

When the locking ring is moved in the positioning of a reel, it is obvious that the plates 12 will move with the locking ring and since the same is positioned under the tubular member 15, it will be seen that the elongated opening 16 of the tubular member will be closed to insure against foreign matter passing to the movable parts of the device.

A finger grip 25 is secured to the handle at a point adjacent to the locking ring and is adapted to be engaged by the forefinger of the person using the rod to facilitate the casting operation.

In the form of the invention as illustrated by Figures 6 and 7, the handle is indicated by the reference character 30 and is formed with a longitudinal bore to accommodate the rod 31 which is formed with a threaded bore 32 in which the threaded bolt 33 operates, the threaded bolt 33 being formed with spaced heads 34 and 35 that are positioned on opposite sides of the ferrule 36, there being provided a knurled operating member 37 secured to the member 33 for rotating the member 33 to move the rod 31 through the bore of the handle.

At the forward end of the handle is a tubular member 38 in which the member 40 is positioned, the member 39 being formed with a cut out portion to accommodate the plates 12 that are connected with the rod 31 by means of the pin 41, to the end that as the rod is moved, the plates will move to close the space between the forward end of the handle 30 and the member 39 to exclude foreign matter from the working parts of the device.

This pin 41 connects with the locking ring 42 to move with the pin as the rod 31 is moved. The ring 42 is formed with an offset portion to be fitted over one end of the plate of a line reel, the opposite end of the plate of the reel being fitted under the enlargement 43, where it is locked against movement.

As clearly shown by Figure 6, the enlargement 43 is formed in the ferrule 44 that is fitted over one end of the handle. In this form of the invention, the hand grip is indicated at 45. From the foregoing it will be seen that due to this construction the rod 31 may be moved longitudinally of the handle by rotating the member 37, to the end that the locking ring may be moved to its active or inactive position.

Further modified forms of the invention are illustrated by Sheet 3 of the drawings, in which the handle is indicated by the reference character 46, which is formed with a bore to accommodate the tubular rod receiving member 47, the bore being constructed to define a shoulder 48. Resting on the shoulder 48 is a disk 49 to which one end of the coiled spring 50 is connected, the opposite end of the coiled spring being connected with the member 51 that slides in the bore.

The reference character 52 indicates a pin that extends through the member 51 and which connects with the finger piece 53 that slides over the tubular member 54 of the handle.

The finger piece 53 is in the form of a locking ring that has an offset portion to receive a portion of the reel base which is secured to the handle, the reel base is also secured by means of the sleeve 55 which also has an offset portion.

Thus it will be seen that when the finger piece or locking ring is moved against the tension of the spring 50, and released, the locking ring will move over the base of the reel positioned on the handle to lock the same in position.

In the handle as shown by Figure 9, the bore is supplied with a tubular housing 56 which is formed with an opening at one end thereof to accommodate the rod 57 that is provided with an eye at one end thereof to accommodate the pin 58 which is secured to the locking ring 59. Surrounding the rod 57 is a coiled spring 60 that has one end thereof bearing against the disk 61 at one end of the rod 57. Thus it will be seen that as the locking ring 59 is moved or pulled along the handle, the spring will act to return the locking ring to its initial or locking position when the locking ring is released, thereby securing a reel in position.

I claim:—

1. In a fishing rod handle, a body portion including spaced members, a tubular member for connecting the spaced members, said tubular member having elongated openings, means at one end of the body portion for embracing one end of a reel plate, a sleeve supported under the tubular member and adapted to close the space between the spaced members of the handle, a rod disposed within the handle, a pin connected with the rod and extended through the sleeve and elongated openings to connect with the ring, means for moving the rod to operate the locking ring, and said sleeve adapted to move with the rod.

2. In a fishing rod handle, a body portion having a longitudinal bore, a pin extending into the bore, at one end of the handle, said pin having a reduced portion, a rod extending into the bore and having a reduced portion, an expansible spring positioned over the reduced ends of the pin and rod to normally urge the rod away from the pin, a tubular member at one end of the handle and having elongated openings, a sleeve movable under the tubular member, a transversely disposed pin connected with the rod and passing through the sleeve and elongated openings, a pocket on the handle and a movable locking ring secured by the transverse pin and cooperating with the pocket to secure the reel plate to the handle.

3. In a fishing rod handle, a body portion having a bore, a tubular member at one end of the handle and having elongated openings formed therein, a sleeve operating under the tubular member and adapted to normally close the openings, a stationary ferrule mounted on the handle, a locking ring cooperating with the ferrule to secure a reel plate to the handle, said pin extending through the sleeve and tubular member and through the locking ring to secure the sleeve and locking ring together, said pin extending through the elongated openings, and means within the bore for urging the locking ring and sleeve in one direction.

In testimony that I claim the foregoing as my own, I have hereto affixed my signature.

JOSIAH W. POWELL.